C. M. WHITTIER.
WIPER ATTACHMENT FOR SHEARING MACHINES.
APPLICATION FILED SEPT. 21, 1915.
1,171,289.
Patented Feb. 8, 1916.
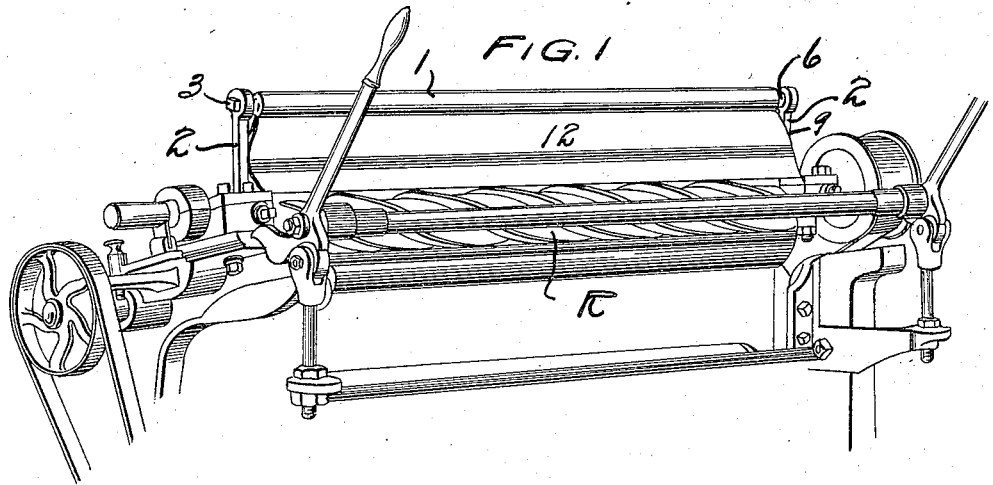
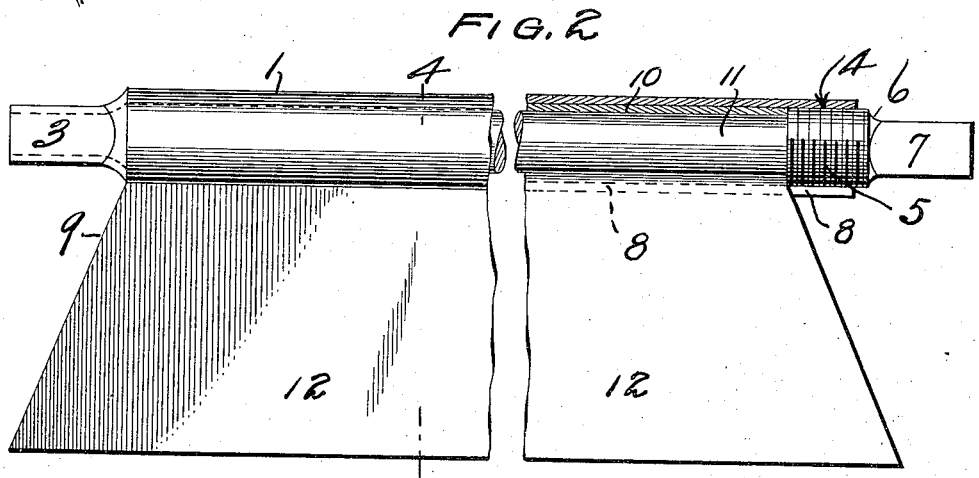
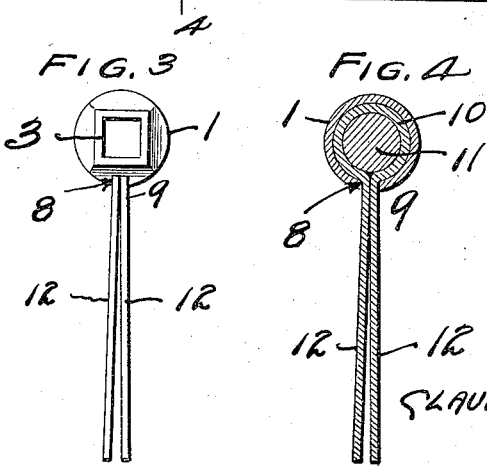 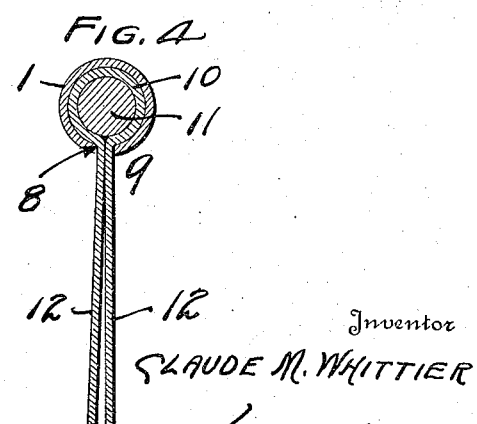
Inventor
CLAUDE M. WHITTIER

UNITED STATES PATENT OFFICE.

CLAUDE M. WHITTIER, OF METHUEN, MASSACHUSETTS, ASSIGNOR TO MILLS MACHINE COMPANY, OF LAWRENCE, MASSACHUSETTS, A CORPORATION OF MASSACHUSETTS.

WIPER ATTACHMENT FOR SHEARING-MACHINES.

1,171,289.  Specification of Letters Patent.  Patented Feb. 8, 1916.

Application filed September 21, 1915. Serial No. 51,835.

*To all whom it may concern:*

Be it known that I, CLAUDE M. WHITTIER, a citizen of the United States, residing at Methuen, in the county of Essex and State of Massachusetts, have invented certain new and useful Improvements in Wiper Attachments for Shearing-Machines, of which the following is a specification.

This invention relates to an attachment for shearing machines of the type usually employed in cloth-finishing operations and the like, and has special reference to novel and improved means for keeping the cutting edges of the shearing rollers in prime cutting condition.

To this end, the invention has in view a device commonly known to the art as a "wiper" which preferably includes in its usual form a strip or apron of oiled felt or the like which lies against the shearing edges of the rotary shearing knife to keep them oiled and in much better condition to do the shearing, and also keeps the same free from dust or lint from the cloth or fabric being finished. Devices of this kind now in use employ tacks for holding the felt to a supporting rod, and often these fastenings work loose and fall out, thereby damaging the shearing roller and at the same time ruining the cloth or fabric passing through the machine.

Therefore, the present invention has for its purpose, the elimination of fastening elements that are apt to work loose or fall out, and at the same time provide other practical features and advantages.

Another object of the invention is to provide a simple and substantial device that may be easily and economically made, and also readily assembled and taken apart to renew the felt apron that contacts with the shearing roll. In this connection, the invention also contemplates the provision of novel means for holding the felt in place, and also a longitudinally adjustable supporting bar, whereby the entire device may be readily fitted to the usual machine supports, even though they may vary slightly in distance apart on different types or makes of machines.

With the above and other objects in view which will more readily appear as the nature of the invention is better understood, the same consists in the novel construction, combination and arrangement of parts hereinafter more fully described, illustrated, and claimed.

A preferred and practical embodiment of the invention is illustrated in the accompanying drawings, in which—

Figure 1 is a perspective view of a portion of a shearing machine showing the application of the invention. Fig. 2 is an elevation partly in section of the improved attachment. Fig. 3 is an end elevation. Fig. 4 is a cross section on the line 4—4 of Fig. 2.

Similar reference characters designate corresponding parts throughout the several figures of the drawings.

In carrying out the invention, it is proposed to utilize a supporting member 1 in the nature of a tube, the same being of any desired cross-sectional design, but preferably cylindrical as shown in the drawings. This supporting member may be mounted upon the machine in any suitable manner, as for instance by the standards 2. By reference to Fig. 2, it will be observed that one end of this tube or supporting member is drawn into a square bracket end 3, while the opposite end is provided with interior threads 4 for receiving the threaded shank 5 of a detachable cap or plug 6, the head 7 of which is preferably square in cross section to correspond to the end 3.

Extending throughout the length of the cylindrical body of the tube is a longitudinal slot 8, which is closed at the end adjacent the squared bracket portion 3, and open at the end wherein the screw plug 6 is inserted. Thus, an open-end slot is provided which is capable of removably receiving a wiper member 9 which may be of any desired material, but preferably felt. As shown in Figs. 2 and 3, particularly the latter, this wiper member is folded upon itself to thereby provide a loop 10 along the line of fold which readily receives a core 11 for forcing the fabric into engagement with the inner wall of the tube, thus securely holding the same in place. The said core 11 is preferably in the nature of a round rod or bar of wood, and when in place holds the wiper member in such a manner that the shear contacting aprons 12 project through the slot 8 and depend loosely from the member 1. These aprons are adapted to be oiled and so arranged on the machine that they lie against the shearing edges of the shearing roll R, as shown in Fig. 1, to thus keep the shearing edges oiled, and also remove the result of the cutting operation therefrom.

In connection with the holding of the wiper body 9 in the tube, it will be observed that the plug 6, when screwed in the end of the tube locks the core 11 within the same, thus preventing the wiper body from being removed while the device is in use. However, the important and practical feature of removing the wiper for reoiling or renewal is readily provided for by taking the supporting member 1 from the brackets 2 of the machine and then withdrawing the screw plug 6 from the threaded end of the tube. That is to say, when the plug 6 is removed it is possible for the core to be withdrawn together with the wiper body out of the tube and slot 8.

Not only has the plug 7 the function of locking the core 11 in place, but being in threaded engagement with the tube also provides an adjustment therefor, whereby the length of the same may be readily adapted to variations in the distance between the standards 2 on the machine with which it is intended to be used. In other words, by the screwing in and out of the plug, the support or tube 1 becomes longitudinally adjustable.

From the foregoing, it will be clear that the present invention contemplates holding the felt wiper member 9 detachably in the tube 1, so that no small fastenings are employed which are liable to fall out, and thereby interfere with the shearing rollers, or in any way spoil the fabric passing through the machine. Furthermore, the invention provides for the ready removal and replacing of the wiper body, with little or no trouble, and at the same time preserves all of the elements of the supporting member 1, so that there is practically no cost of maintenance incident to the attachment, except the renewals of the felt wiper body.

Without further description it is thought that the many features and advantages of the invention will be apparent, and it will of course be understood that various changes in the form, proportion, and minor details of construction may be resorted to without departing from the spirit or sacrificing any of the advantages of the invention.

I claim:

1. An attachment for shearing machines comprising a hollow adjustable supporting member, a wiper member, and means for detachably holding said wiper member within said hollow adjustable supporting member.

2. An attachment for shearing machines comprising a tubular supporting member, a folded wiper member, and a core insertible within the folded portion of said wiper for holding the same in the tube.

3. An attachment for shearing machines comprising a tubular supporting member having a longitudinal slot, and a square bracket end, a folded wiper member, and a core insertible within the folded portion of said wiper for holding the same in the tube, and an adjustable plug at the end of said tube opposite the bracket end.

4. An attachment for shearing machines, comprising a hollow supporting member having a slot, a folded wiper member having depending shear contacting aprons, and a core removably inserted in the fold of said wiper body to hold the same in the hollow supporting member so that the said shear contacting aprons depend through said slot.

5. An attachment for shearing machines, comprising a hollow supporting member having a slot, a wiper member, a removable core for holding said wiper member within said hollow supporting member so that a portion thereof projects therefrom through said slot, and means for removably locking said core within the supporting member.

6. A wiper attachment for shearing machines comprising a hollow supporting member having a longitudinal slot, a wiper member, a removable core for holding said member in said supporting member so that a portion thereof depends therefrom through said slot, and an adjustable plug at one end of said supporting member for holding the core within the same and also varying the length thereof.

7. A wiper attachment for shearing machines, comprising a tubular supporting member having a longitudinal slot and a squared bracket portion at one end, and also having interior threads at its other open end, a folded wiper member, a core insertible within the folded portion of said wiper member for clampingly holding the same within the tube, and an adjustable plug having a threaded portion for engaging the interior threads at one end of the tube, and also having a squared bracket portion.

In testimony whereof I hereunto affix my signature in the presence of two witnesses.

CLAUDE M. WHITTIER.

Witnesses:
 WALTER COULSON,
 HELEN A. SMITH.

Copies of this patent may be obtained for five cents each, by addressing the "Commissioner of Patents, Washington, D. C."